(12) United States Patent
Shinagawa et al.

(10) Patent No.: US 7,304,602 B2
(45) Date of Patent: Dec. 4, 2007

(54) AXIAL DEVIATION DETERMINING METHOD FOR ON-VEHICLE RADAR

(75) Inventors: Tokio Shinagawa, Kobe (JP); Sunao Ueda, Kobe (JP)

(73) Assignee: Fujitsu Ten Limited (JP)

( * ) Notice: Subject to any disclaimer, the term of this patent is extended or adjusted under 35 U.S.C. 154(b) by 127 days.

(21) Appl. No.: 11/145,902

(22) Filed: Jun. 6, 2005

(65) Prior Publication Data

US 2005/0285778 A1 Dec. 29, 2005

(30) Foreign Application Priority Data

Jun. 28, 2004 (JP) ............................. 2004-190308

(51) Int. Cl.
*G01S 7/40* (2006.01)
*G01S 13/42* (2006.01)
*G01S 13/93* (2006.01)

(52) U.S. Cl. ................. 342/174; 342/70; 342/133; 342/139; 342/141; 342/146

(58) Field of Classification Search ............ 342/70–72, 342/133, 139, 141, 146, 147, 152, 174; 340/435, 340/436, 903; 701/301
See application file for complete search history.

(56) References Cited

U.S. PATENT DOCUMENTS

| | | | |
|---|---|---|---|
| 4,331,958 A * | 5/1982 | Lacomme | 342/152 |
| 5,670,963 A * | 9/1997 | Kubota et al. | 342/70 |
| 5,832,407 A | 11/1998 | Kai et al. | |
| 5,959,569 A * | 9/1999 | Khodabhai | 342/70 |
| RE36,819 E * | 8/2000 | Gellner et al. | 342/70 |
| 6,122,040 A * | 9/2000 | Arita et al. | 356/4.01 |
| 6,356,229 B1 | 3/2002 | Schneider | |
| 6,690,319 B2 * | 2/2004 | Matsui et al. | 342/70 |
| 6,954,174 B2 * | 10/2005 | Isaji et al. | 342/173 |
| 7,239,580 B2 * | 7/2007 | Intrator et al. | 367/101 |

(Continued)

FOREIGN PATENT DOCUMENTS

EP 0 782 008 A2 7/1997

(Continued)

OTHER PUBLICATIONS

"Monopulse-Doppler Radar Front-End Concept for Automotive Applications Based on RF MEMS Technology", Van Caekenberghe, K.; Sarabandi; K. Electro/information Technology, 2006 IEEE International Conference on May 2006 Ps:1-5.*

(Continued)

*Primary Examiner*—John B Sotomayor
(74) *Attorney, Agent, or Firm*—Fogg & Powers LLC; Gregory M. Taylor

(57) ABSTRACT

An on-vehicle radar and a method of determining an axial deviation of the radar using stationary objects free of erroneous determination are disclosed. The amount of axial deviation of the radar is determined from the calculated stationary object line based on the distribution of stationary objects. In the case where such a factor for determining the calculated stationary object line as to reduce the calculation accuracy of axial deviation is detected in the distribution of stationary objects, the calculation of the amount of the particular axial deviation is canceled.

7 Claims, 11 Drawing Sheets

U.S. PATENT DOCUMENTS

| | | | |
|---|---|---|---|
| 2001/0018641 A1* | 8/2001 | Kodaka et al. | 701/301 |
| 2003/0122703 A1* | 7/2003 | Kishida et al. | 342/70 |
| 2004/0000991 A1* | 1/2004 | Schiffmann et al. | 340/435 |
| 2004/0027272 A1* | 2/2004 | Richardson et al. | 342/70 |
| 2004/0080449 A1 | 4/2004 | Horibe | |
| 2004/0236491 A1* | 11/2004 | Seto | 701/96 |
| 2004/0246471 A1* | 12/2004 | Matsuura et al. | 356/141.4 |
| 2005/0285778 A1* | 12/2005 | Shinagawa et al. | 342/173 |

FOREIGN PATENT DOCUMENTS

| | | |
|---|---|---|
| EP | 0 899 581 A2 | 3/1999 |
| EP | 1 286 177 A1 | 2/2003 |
| JP | 06004799 A * | 1/1994 |
| JP | 06160510 A * | 6/1994 |
| JP | 08320371 A | 12/1996 |
| JP | 09090033 | 4/1997 |
| JP | 09218265 A | 8/1997 |
| JP | 09281239 A | 10/1997 |
| JP | 10132939 A | 5/1998 |
| JP | 200166051 | 6/2001 |
| JP | 2003149343 A | 5/2003 |

OTHER PUBLICATIONS

Kederer et al., "Sensor-based determination of angular misalignment and lane configuration of a radar sensor for ACC-applications", Proceedings of the 30th European Microwave Conference, Oct. 4, 2000, pp. 313-316, vol. 2, Publisher: 30th European Microwave Conference, Published in: Paris.

* cited by examiner

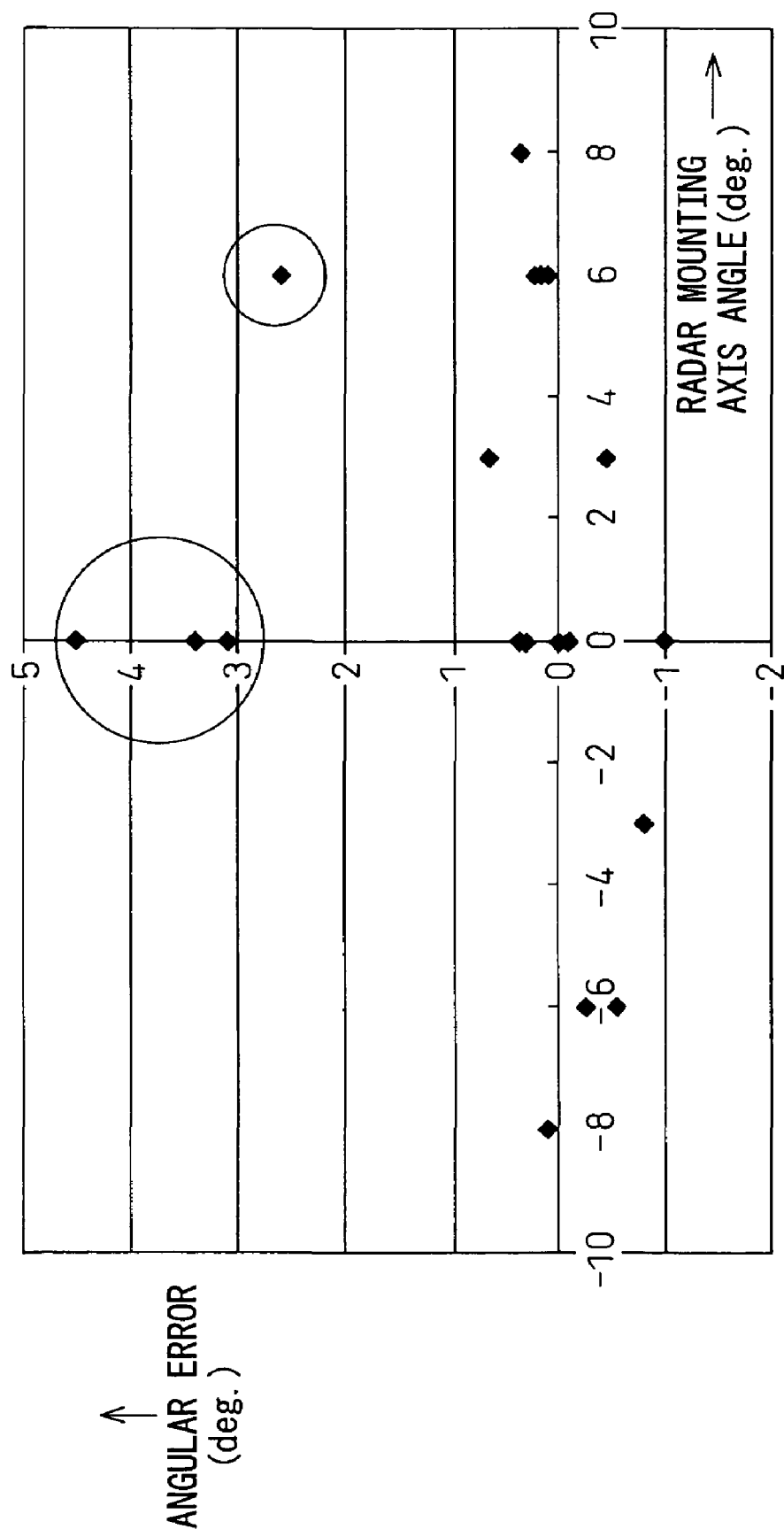

AXIAL DEVIATION DETERMINING METHOD FOR ON-VEHICLE RADAR

BACKGROUND OF THE INVENTION

1. Field of the Invention

The present invention relates to an on-vehicle radar or, in particular, to a method of determining the axial deviation of the on-vehicle radar using the track of a stationary object.

2. Description of the Related Art

The use of a scanning-type radar on a vehicle requires that the axis of the direction in which an automotive vehicle is running straight coincides exactly with the center line of beam scanning. A deviation, if any, of the axis due to the vibration or the positional variation of the radar while the vehicle is running would result in an erroneous detection of the position of an object such as another vehicle running ahead. While the vehicle is running, therefore, the axial deviation is detected constantly and corrected (Japanese Unexamined Patent Publication No. 2001-166051) (Patent Document 1).

FIGS. 1 to 2B show an example of the conventional method of axial deviation.

FIG. 1 shows an example of a straight road having lanes 12, 14 on the left and right sides of a white center line 13 with guard rails 11 and 15 providing stationary objects on the sides of the road on which a vehicle 10 is running along the left lane 12.

FIG. 1 also shows both a radar detection area 18a without any axial deviation of the radar mounted on the vehicle 10 and a radar detection area 18b having a rightward axial deviation (at axial deviation angle θ). Reference numeral 16 designates the axis of the direction in which the vehicle 10 is running straight, and numerals 17a, 17b the scanning center axes of the beams of the radar detection areas 18a, 18b, respectively.

FIG. 2A shows an example of detection of a stationary object without any axial deviation.

In this case, the beam is scanned in the radar detection area 18a, and the distance to the guard rails 11, 15 providing stationary objects is detected a plurality of times for each beam angle ($\Phi_i$) within a predetermined time length. The result of detection is plotted on the x-y coordinate with the current position of the vehicle 10 as the origin, the ordinate representing the straight distance covered and the abscissa the left and right lateral positions. FIG. 2B is the same as FIG. 2A except that in FIG. 2B, the beam is scanned in the radar detection area 18b which has developed an axial deviation (axial deviation angle θ).

In FIGS. 2A, 2B, each boundary between the road and the guard rails 11, 15 providing the stationary objects (hereinafter referred to as the calculated stationary object line), calculated using a predetermined algorithm based on the detection data, is illustrated by a thick solid line. In the state free of axial deviation shown in FIG. 2A, the calculated stationary object line is parallel to the axis 16 of the direction in which the vehicle is running straight ahead. In the state which an axial deviation has developed, as shown in FIG. 2B, on the other hand, the calculated stationary object line is tilted by the axial deviation angle θ from the axis 16 of the direction in which the vehicle 10 is running straight ahead. As a result, the axial deviation of the radar mounted on the vehicle 10 can be detected and, if necessary, the axial deviation angle θ is corrected by the axial deviation adjusting mechanism in the vehicle 10.

An axial deviation may be detected by the method described above, however, it may also be detected in accordance with the environment or mode in which the vehicle is running as well as due to the actual axial deviation of the radar. If, for example, a guard rail is also formed in the side strip constituting a part of the road, or a tunnel entrance narrower than the width between the guard rails exists ahead, or the vehicle changes the lane on a two-lane road, the data on the stationary objects detected a plurality of times within a predetermined time length and accumulatively plotted and displayed are not as simple as the linear form shown in FIGS. 2A, 2B, but have a complicated shape with some redundancy containing a plurality of rises therein.

In the case where the calculated stationary object line is determined from the detection data having such a complicated shape, there is a problem that the calculation accuracy is reduced and the radar, even if correctly installed (with the radar detection area 18a), may detect an erroneous axial deviation (with the radar detection area 18b). Another problem is that automatic adjustment of the radar angle to compensate for the erroneously detected axial deviation would adversely affect the control of the running vehicle.

SUMMARY OF THE INVENTION

In view of the problems described above, it is an object of this invention to provide an axial deviation determination method for an on-vehicle radar, in which in the case where the stationary object detection data by beam scanning meets predetermined conditions for axial deviation determination, the process of determining the calculated stationary object line including the particular data is canceled thereby to prevent the erroneous determination of an axial deviation and the erroneous adjustment of the axial deviation at the same time.

According to one aspect of this invention, there is provided an axial deviation determining method for an on-vehicle radar to determine an axial deviation amount of the radar from a calculated stationary object line determined by the distribution of stationary objects, wherein, in the case where such an element for determining a calculated stationary object line as to reduce the calculation accuracy of the axial deviation amount is detected in the distribution of stationary objects, the calculation of the axial deviation amount involving the particular element is canceled.

According to another aspect of the invention, there is provided an axial deviation determining method for an on-vehicle radar, comprising the first step of acquiring the information on the position of each stationary object by beam scanning within a predetermined time length and the number of times the particular positional information is detected, the second step of converting the positional information into the address information of a grid-like table with the current vehicle position as the origin, the lateral position of the vehicle on the abscissa and the distance covered by the running vehicle on the ordinate, and storing the number of times detected in a grid area corresponding to the address information, the third step of determining the first angle calculation grid unit providing a reference for the calculated stationary object line from a grid column along a predetermined ordinate in the grid-like table, the fourth step of determining an angle calculation grid unit of a grid column along the predetermined ordinate for the next distance range along the direction in which the vehicle is running, within the range of the abscissa including the angle calculation grid unit and the grid units on the left and right sides thereof and sequentially repeating the process, and the fifth step of withholding the calculation to determine a calculated stationary object line connecting the determined angle calculation grid unit upon detection of a plurality of rises in the number times detected, from the grid column of the next distance range within the range of the abscissa including the angle calculation grid unit and the predetermined number of grid units on the left and right sides thereof at the fourth step.

According to this invention, there is provided an axial deviation determining method for an on-vehicle radar wherein, in the case where the stationary object detection data by beam scanning meets predetermined conditions of determining the axial deviation, the calculation for determining the axial deviation is canceled thereby to prevent the erroneous determination of an axial deviation and eliminate the axial deviation adjustment based on the erroneous determination.

BRIEF DESCRIPTION OF THE DRAWINGS

The present invention will be more clearly understood from the description as set forth below with reference to the accompanying drawings.

FIG. 11 is a diagram showing an example of the effects of an application of this invention.

DESCRIPTION OF THE PREFERRED EMBODIMENTS

Before describing the invention in detail, the conventional axial deviation determining method is explained briefly below.

Figure 3:
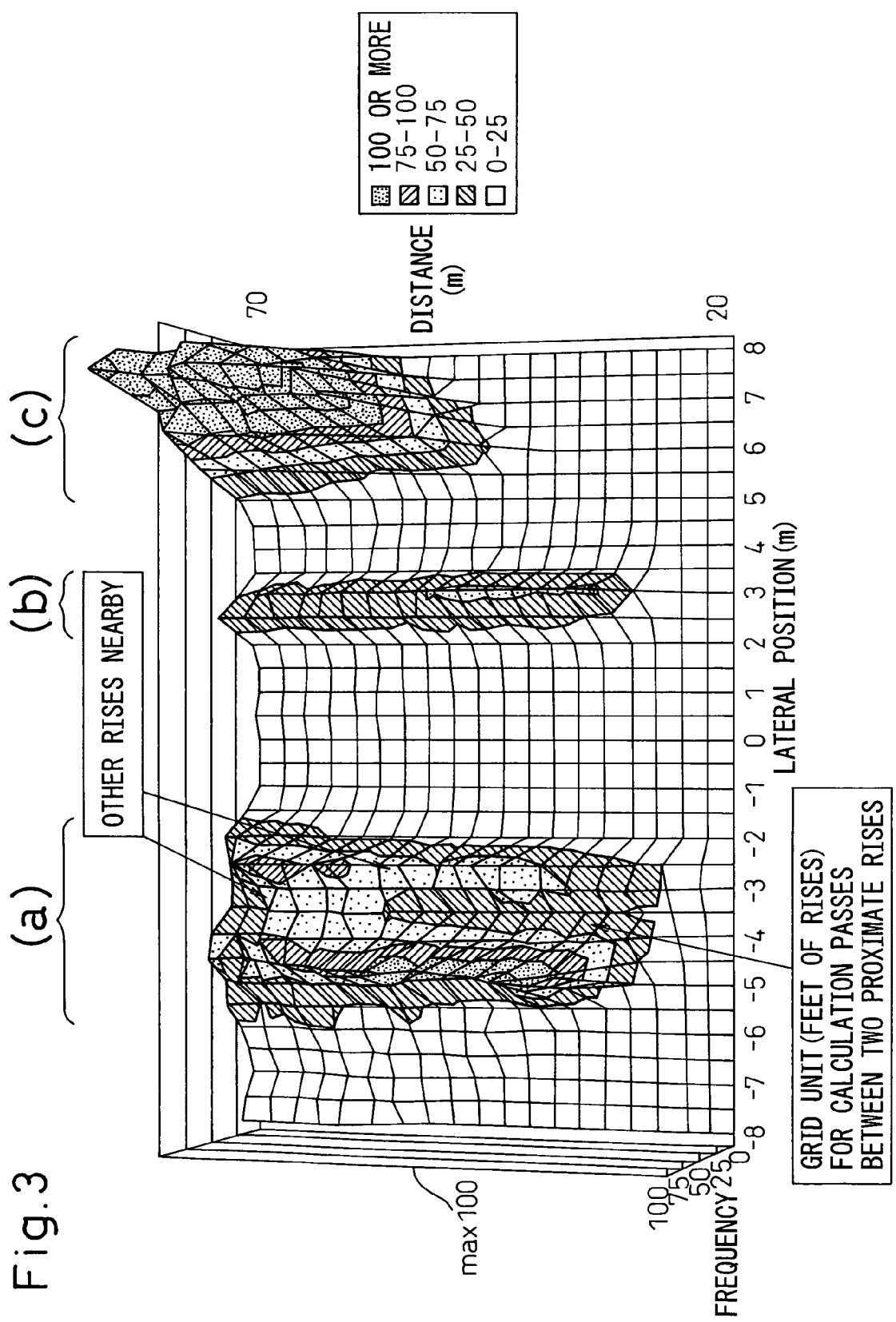
FIG. 3 is a diagram showing an example of a map of stationary objects.

FIG. 3 shows an example of the stationary object detection data (map of stationary objects) obtained by beam scanning, and illustrates a case in which a tunnel entrance narrower than the width between guard rails exists ahead along a straight road. In this case, assuming that the current position of a running vehicle is 0 m in the distance along the ordinate and 0 m in the lateral direction along the abscissa, the number of times stationary objects are detected in a radar detection area within a predetermined time length (within a predetermined distance range of 20 m to 70 m) are plotted three-dimensionally as a detection frequency along the height axis on a grid defined by the distance and the lateral position.

The detection frequency "number of times detected" is divided into five stages including 0 to 25, 25 to 50, 50 to 75, 75 to 100 and more than 100, each discriminated by different halftone dot meshing.

The portion (a) in FIG. 3 indicates the stationary object detection frequency while the vehicle running along the left lane approaches a tunnel entrance inside of the left guard rail. Specifically, the detection frequency of the stationary objects is indicated as an accumulation of figures, as an example, for the left guard rail, the delineator in the neighborhood of the tunnel entrance located inside of the left guard rail and the left side wall of the tunnel in that order.

The portion (b) in FIG. 3 indicates the frequency of detection of the median strip with delineators arranged at predetermined intervals, and the portion (c) in FIG. 3 the detection frequency of stationary objects in the neighborhood of the tunnel on the oncoming traffic lane.

Figure 4:
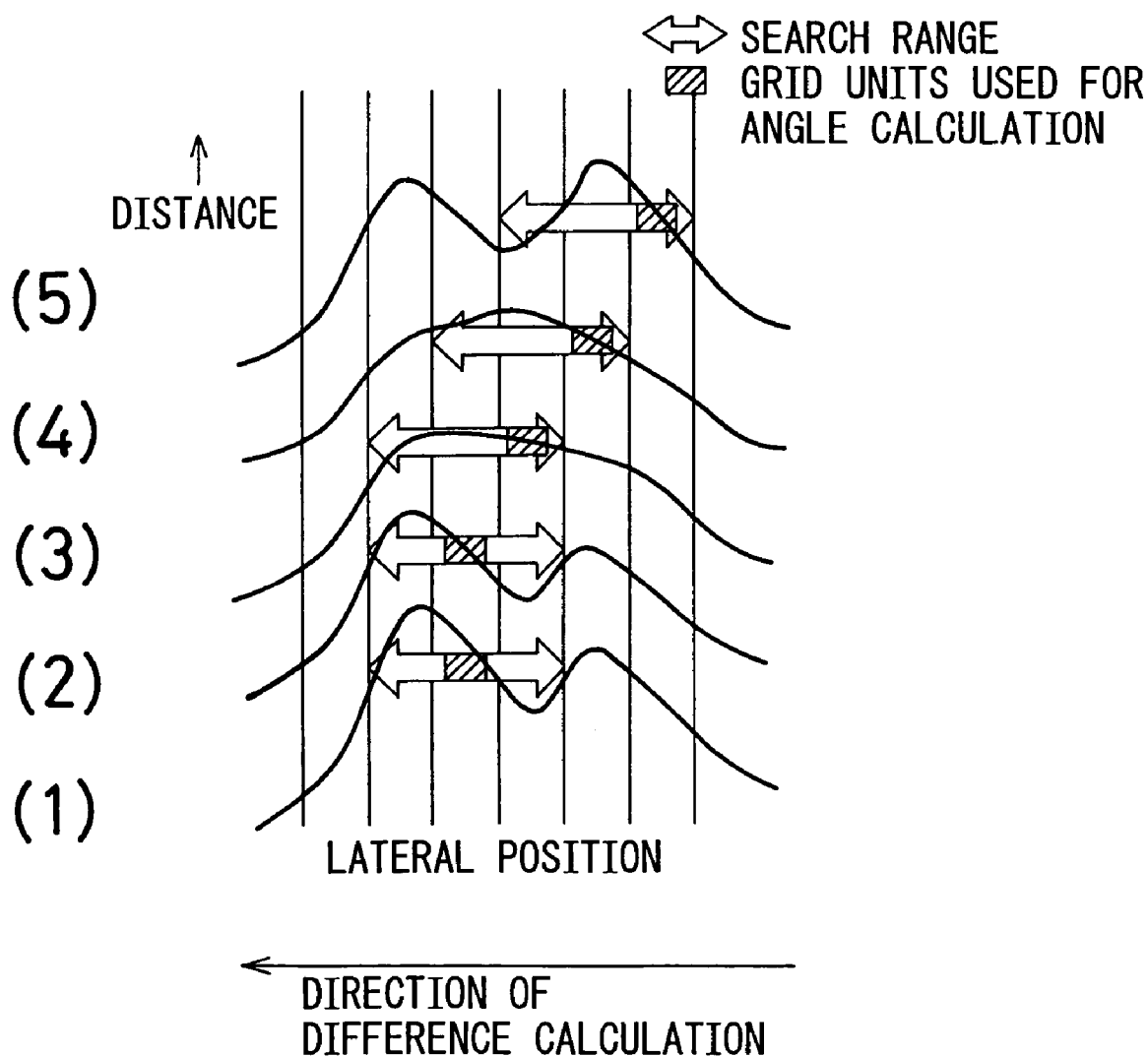
FIG. 4 is a first illustration of a method of determining the calculated stationary object line shown in FIG. 3.
Figure 5:
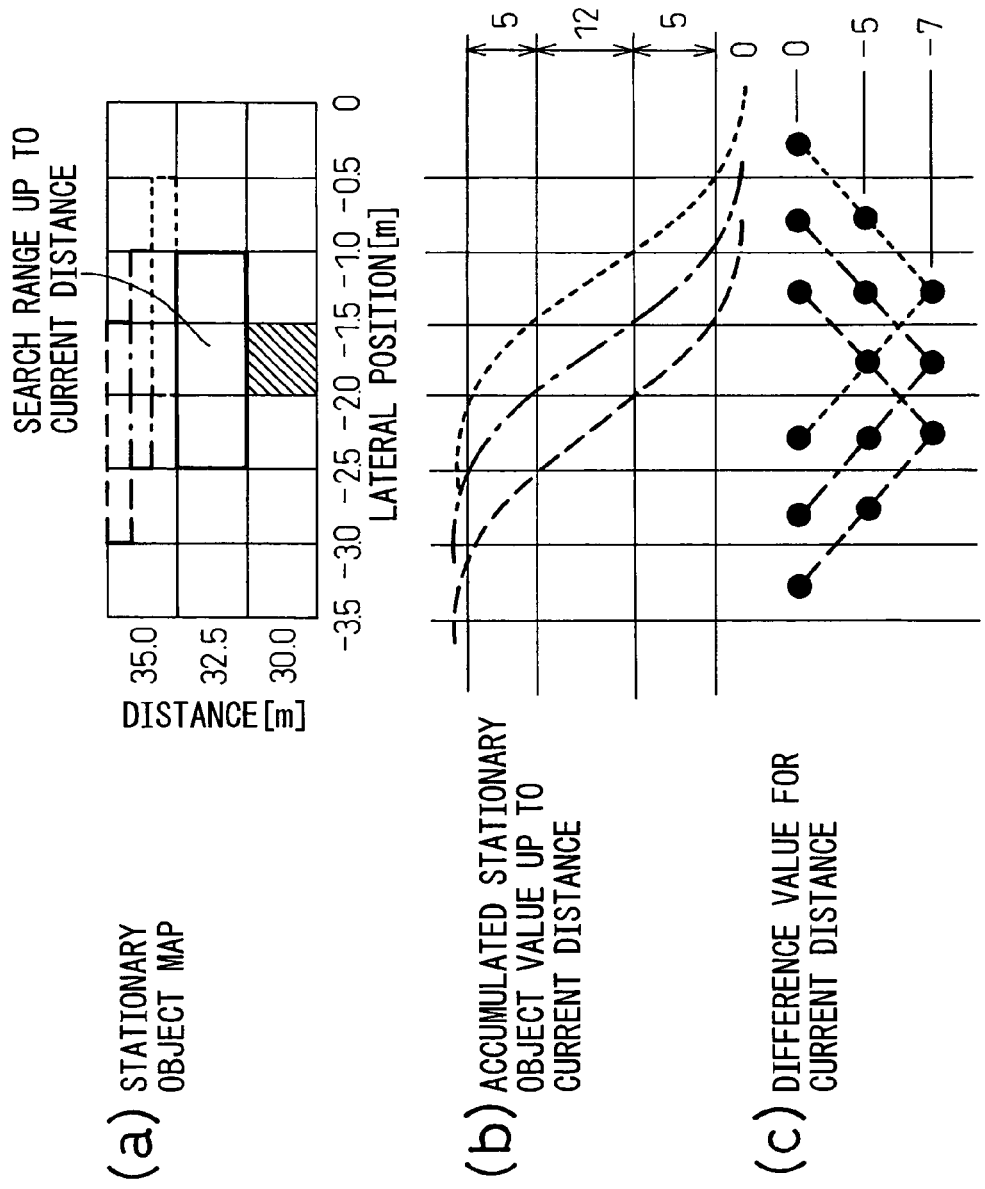
FIG. 5 is a second illustration of a method of determining the calculated stationary object line shown in FIG. 3.

FIGS. 4 and 5 show a conventional method of determining the calculated stationary object line in the example of FIG. 3.

FIG. 4 illustrates the manner in which the calculated stationary object line of the stationary objects located on the left side (0 to −8 m to the left) of the vehicle. In the case under consideration, in order to determine the grid units used for the first angle calculation, the calculation of the detection frequency value difference between adjacent grid units of the grid column nearest to the vehicle is repeated sequentially for lateral positions of 0 m toward −8 m. By this calculation, a grid unit having the largest first tilt angle is detected and determined as a first reference grid unit for angle calculation.

As an example, the grid unit is defined as [ordinate, abscissa], and in the case where the calculation of the calculated stationary object line is started from the ordinate column of 30 m, assume that the detection frequency of grid unit [30, 0] is 0, the detection frequency of grid unit [30, −0.5] as 0, the detection frequency of grid unit [30, −1.0] as 5, the detection frequency of grid unit [30, −1.5] as 12, the detection frequency of grid unit [30, −2.0] as 5, and so forth.

In this case, the differential values of grid units [30, −0.5] to [30, −2.0] are determined as 0 (=0−0), −5 (=0−5), −7 (=5−12) and +7 (=12−5), respectively. As a result, grid unit [30, −1.5] having the largest first tilt value [−7] is determined as the first angle calculation grid unit. In this way, the grid unit having the maximum absolute difference value with minus sign constitutes an angle calculation grid. In the case of FIG. 4, the grid unit used for the angle calculation (1) is determined as the first angle calculation grid unit.

FIG. 4 also shows the grid selection range by white arrows in determining the next angle calculation grid unit. As shown by arrows in FIG. 4, according to the prior art, in order to maintain the continuity of the calculated stationary object line while reducing the calculation amount, the range including the angle calculation grid unit used for the current calculation and the left and right adjacent grid units is set as a limited selection range of the angle calculation grid units used for the next calculation.

FIG. 5 illustrates a method of selecting the next angle calculation grid unit. In (a) of FIG. 5, a part of the map of stationary objects of FIG. 3 is cut out and the first angle calculation grid unit [30, −1.5] determined in the aforementioned example is expressly indicated by halftone dot meshing. As a result, the selection range of the angle calculation grid unit for the current time point (current session) is a range in which grid unit [32.5, −1.5] having the same lateral position of −1.5 m as the preceding (first) angle calculation grid unit in the grid column of 32.5 m along the ordinate for current calculation is regarded as the origin, added by the immediately left grid unit [32.5, −2.0] and the immediately right grid unit [32.5, −1.0]. As shown in FIG. 5, the actual angle calculation grid unit selection range is 1.5 m (=−1.0 to −2.5 m).

Therefore, one of the three grid units including [32.5, −1.0], [32.5, −1.5] and [32.5, −2.0] constituting the current selection range is determined as the current angle calculation grid unit (for the grid column of distance 32.5 m). In the process, a grid unit having the largest absolute differential value with minus sign is selected by the same method as explained in FIG. 4. By determining the current angle calculation grid unit, one of the three frames shown in FIG. 5 having the currently-determined angle calculation grid unit at the center is selected as a selection range of the next angle calculation grid unit (in the grid column of distance 35.0 m).

The portions (b) and (c) of FIG. 5 illustrate an example of the difference calculation to select the next angle calculation grid unit based on the determination of the current angle calculation grid unit. To facilitate understanding, the same detection frequency and differential value as in FIG. 4 are used and are not described any more. After all, the grid having the largest differential value with minus sign is determined as the current angle calculation grid unit.

The method described above is used also to determine the calculated stationary object line of a stationary object located on the right side (lateral positions of 0 to +8 m) of the vehicle in FIG. 3. In this case, however, the difference is calculated from the lateral position of 0 to +8 m.

Figure 1:
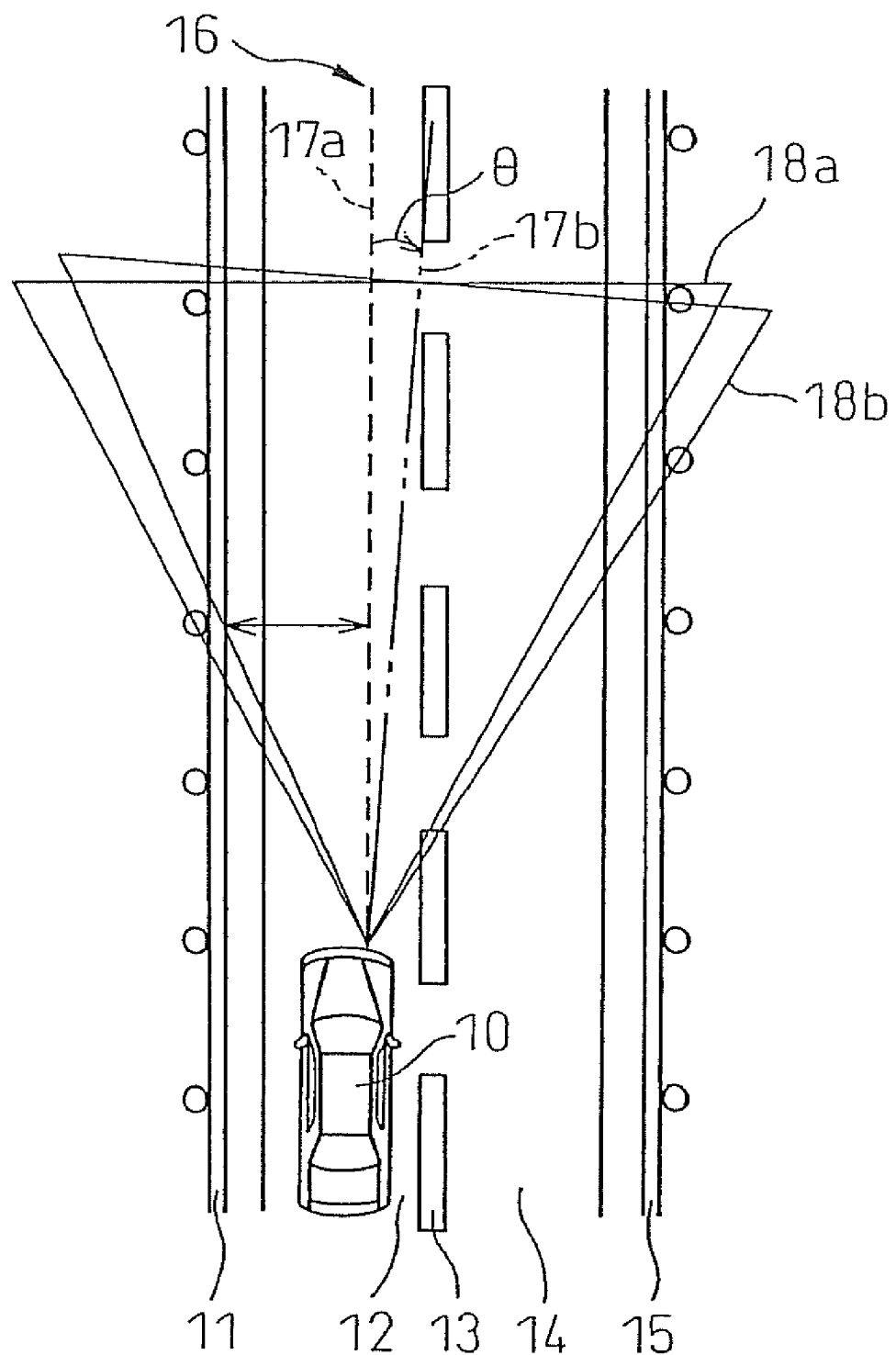
FIG. 1 is a first diagram showing an example of the conventional axial deviation detection method.
Figure 2B:
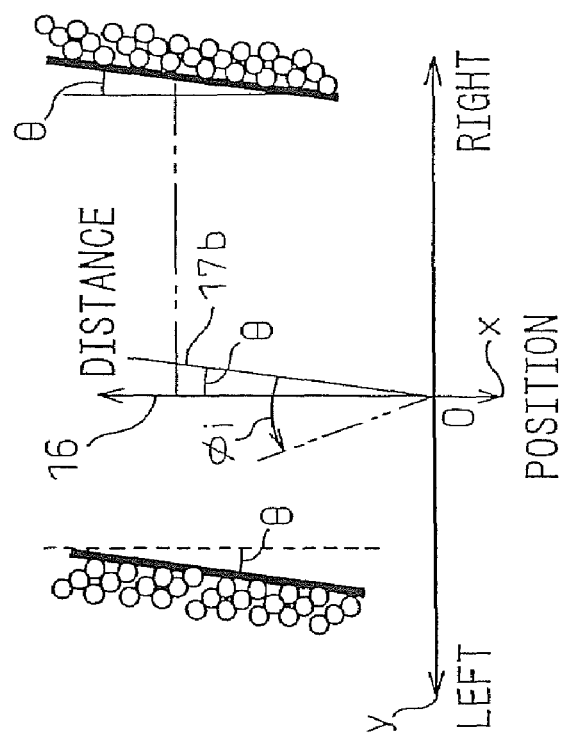
FIG. 2B is a third diagram showing an example of the conventional axial deviation detection method.
Figure 2A:
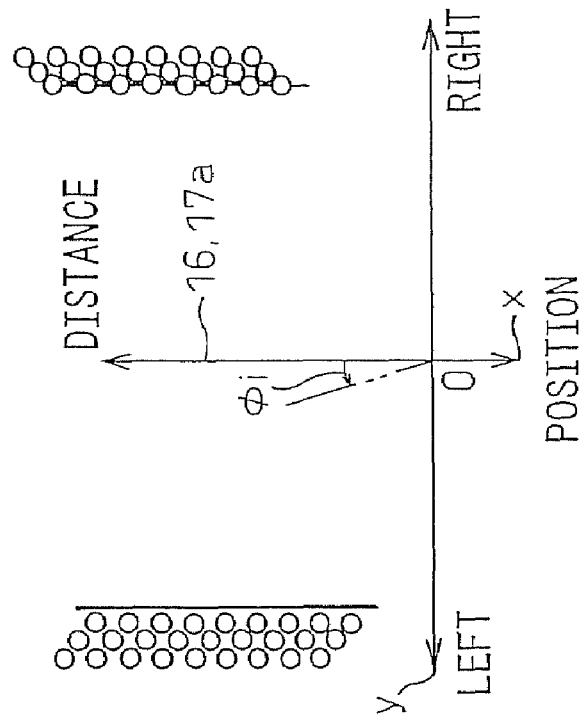
FIG. 2A is a second diagram showing an example of the conventional axial deviation detection method.

Returning to FIG. 4, it is understood from the foregoing explanation that the angle calculation grid unit (halftone dot meshed) and the selection range thereof (white arrow) move progressively from (1) to (5) with the increase in distance, thereby leading to the same calculation result as in the state shown in FIG. 2B in which the axial deviation develops. In the case where the calculated stationary object line is determined from the stationary object detection data having a complicated shape, the calculation accuracy may often be reduced resulting in an erroneous determination of an axial deviation.

Figure 6:
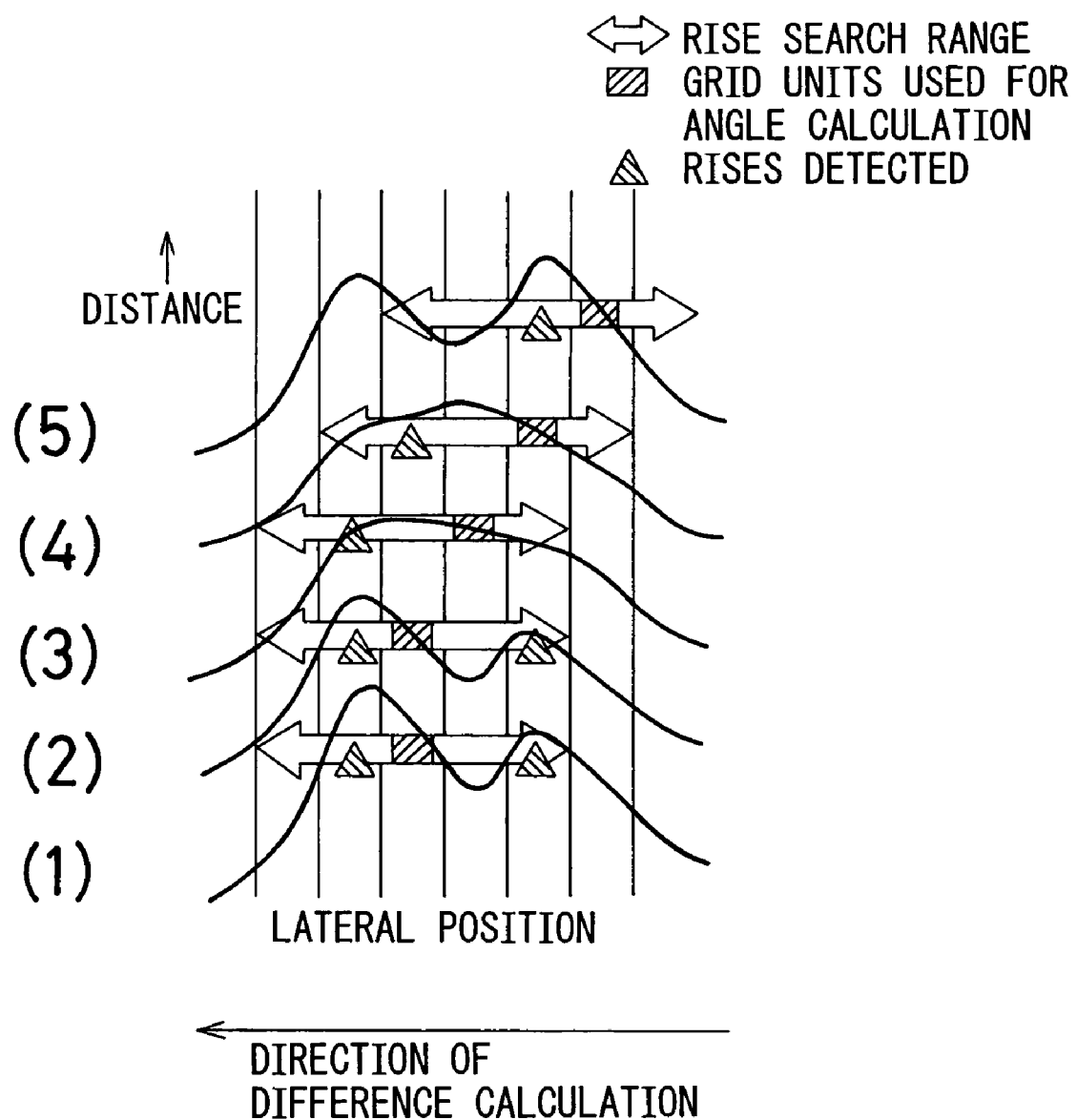
FIG. 6 is a diagram illustrating a method of determining the calculated stationary object line according to the invention.
Figure 7:
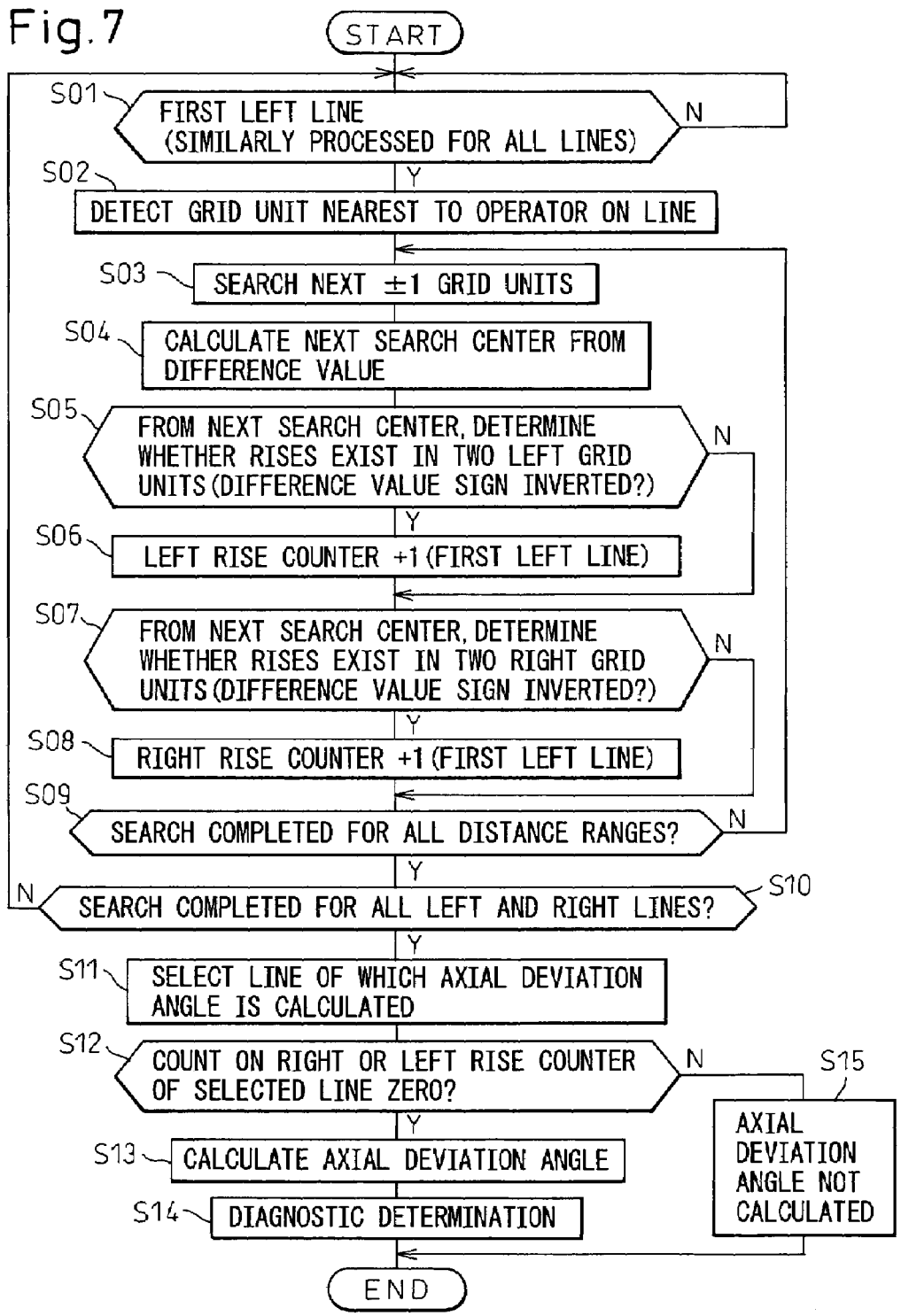
FIG. 7 is a diagram showing an example of a calculation flowchart according to the invention.

FIGS. 6 and 7 show a calculation method of the calculated stationary object line improved to prevent the erroneous determination described above.

To facilitate the understanding, the operating principle is explained first. In this example, a plurality of different "rises" of the stationary object detection frequency are detected within a predetermined range with the angle calculation grid unit of each grid column as a center. The calculated stationary object line determined from the data with a plurality of rises detected are considered to fail to satisfy the calculation accuracy, and the calculation for the axial deviation determination thereof is canceled. As a result, a determination calculation insufficient in calculation accuracy is excluded thereby eliminating the need of the accompanying axial adjustment.

A predetermined range with the angle calculation grid unit as a center has the lateral width (white arrows in FIG. 6) of, say, 2.5 to 3.6 m generating no stationary object data causing an erroneous axial determination calculation even after a lane change on a two-lane road. Also, the "rises" are detected by utilizing the fact that the sign of the differential value of the detection frequency is changed from minus to plus by the rises.

Next, a specific operation of this embodiment is explained mainly by reference to the sequence chart of FIG. 7 with FIG. 6 showing the corresponding operation.

While the vehicle is running along a two-lane road, a total of four views of guard rails including the left and right guard rails taken from the left lane and the left and right guard rails taken from the right lane are normally detected as stationary objects. The first left line is selected first at step S01.

At step S02, the grid column of the selected line nearest to the operator is searched to determine the first angle calculation grid unit. At step S03, the range including the left and right grid units (±1 grid units) adjacent to the first angle calculation grid unit of the grid column in the next distance range, i.e. the selection range of the next angle calculation grid unit is determined. At step S04, the differential value of each of the three selected grid units is determined, and one of them is determined as the next angle calculation grid unit. The process up to this stage is similar to the process described with reference to FIGS. 4 and 5.

At the next step S05, as illustrated in (1) of FIG. 6, it is determined whether the two grid units each on the left and right sides of the determined angle calculation grid unit (indicated by white arrow 2.5 m long) contain a "rise", utilizing the fact that a "rise", if any, changes the sign of the differential value of the detection frequency from "−" to "+".

Upon detection of a "rise" in the two grid units on the left side of the angle calculation grid unit, a "left rise counter" arranged for each line selected at step S01 is incremented by 1 (S05 and S06). Upon detection of a "rise" in the two grid units on the right side of the angle calculation grid unit, on the other hand, a "right rise counter" arranged for each line selected is similarly incremented by 1 (S07 and S08).

The operation up to this stage is performed for all the distance ranges ((1) to (5) in FIG. 6) (S09). This operation is also executed for all the remaining stationary object lines (the remaining views of the three guard rails, for example) (S01).

Next, at step S11, a line of which the axial deviation angle is actually calculated is selected from a plurality of the stationary object lines described above. Before starting this calculation, the counts of both the "counter with left rise" and the "counter with right rise" for the selected stationary object line are referred to, and in the case where both are not zero (two "rises"), the process is ended without calculating the axial deviation angle (S12 and S15). In the case shown in FIG. 6 (as in FIG. 3), therefore, the axial deviation angle is not calculated due to the detection of left and right rises shown in (1) and (2) of FIG. 6. Incidentally, the calculation may be ended in the case where the count is a predetermined threshold value or more.

In the case where the count of one of the "counter with left rise" and the "counter with right rise" for the selected stationary object line is zero (one "rise"), on the other hand, the axial deviation angle is calculated to execute the required process (S13 and S14).

Figure 8:
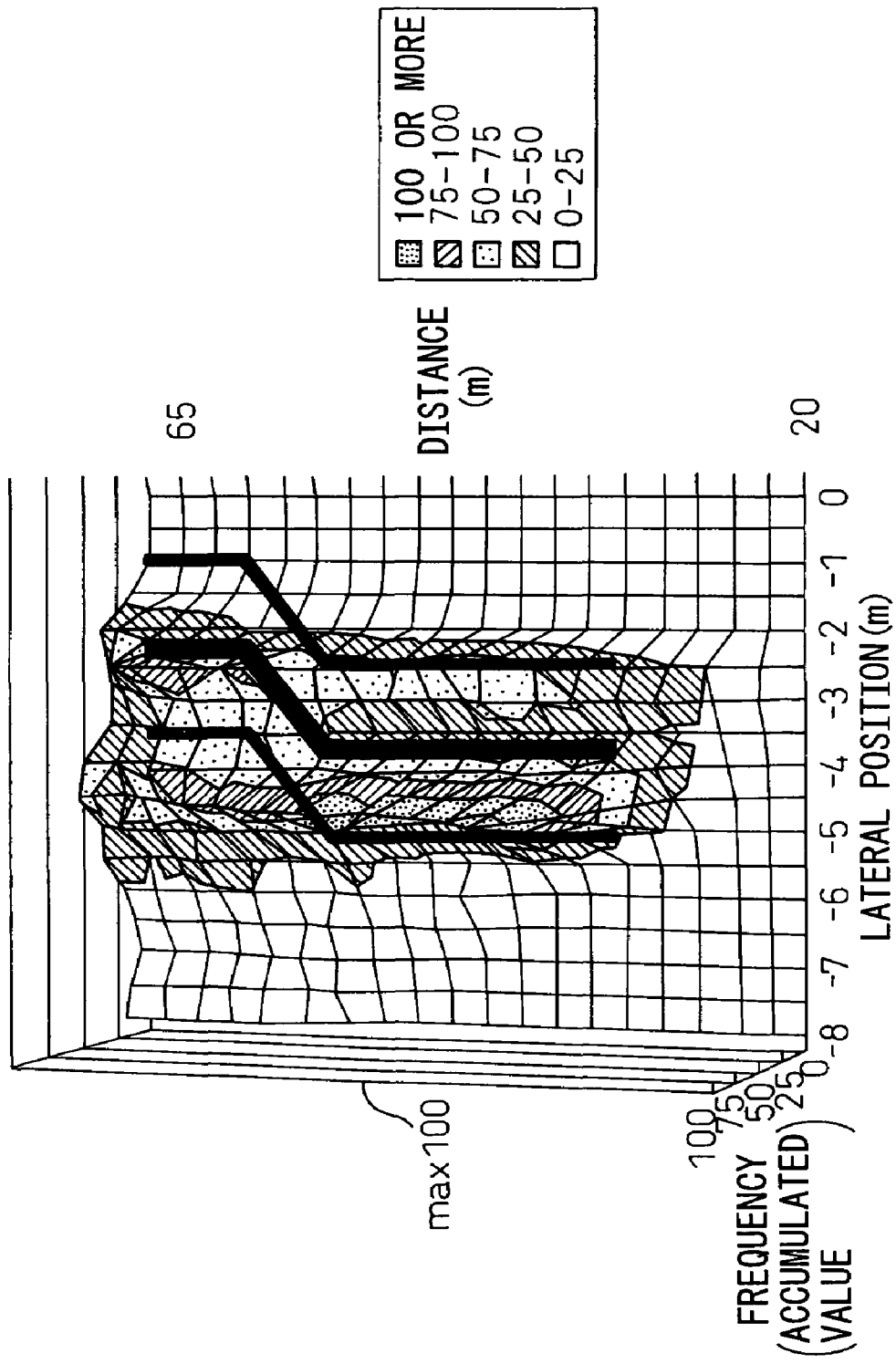
FIG. 8 is a diagram showing an example of a map of stationary objects.
Figure 9:
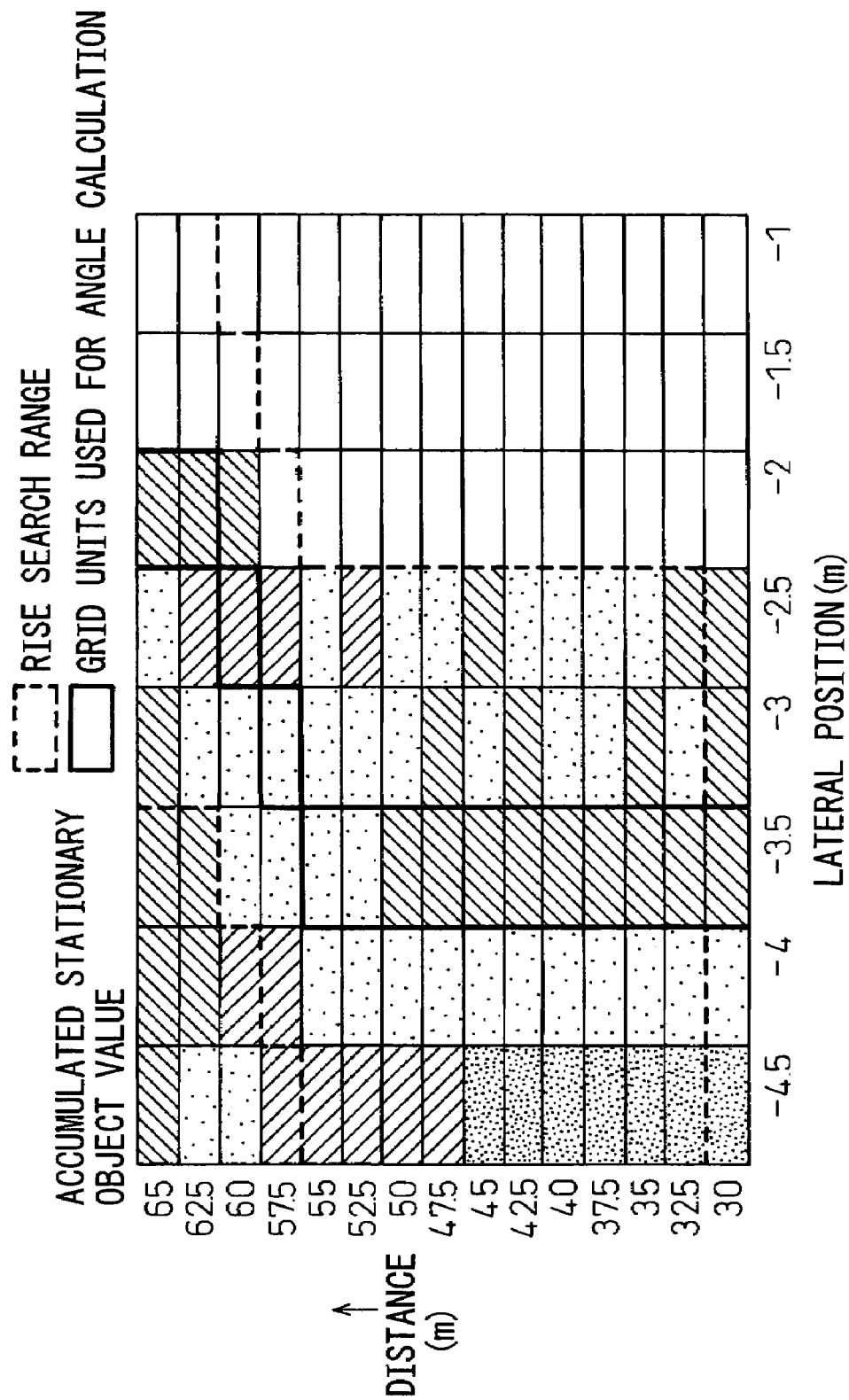
FIG. 9 is a diagram showing a table of RAMs prepared from the map of stationary objects of FIG. 8.
Figure 10:
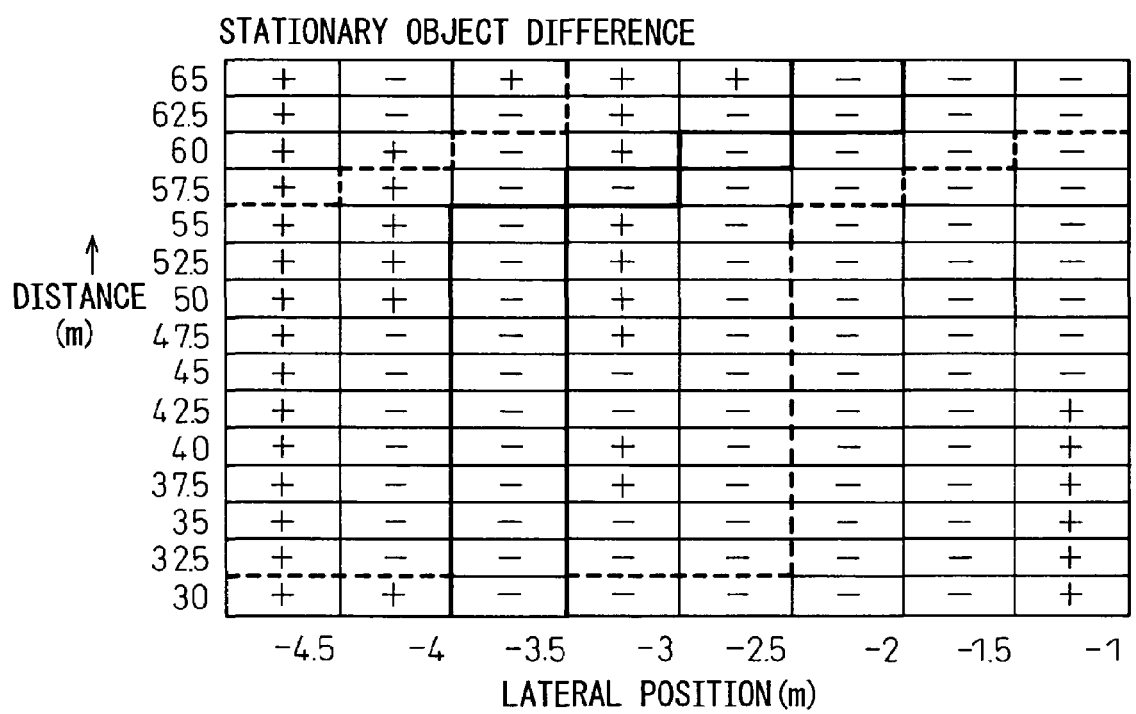
FIG. 10 is a diagram showing the table of FIG. 9 expressed by the difference signs.

FIGS. 8 to 10 show the determination of the axial deviation according to an embodiment.

FIG. 8 shows the portion (a) of FIG. 3 in enlarged form. Of the three lines added, the central one connects the angle calculation grid units for each predetermined distance range, and the left and right lines indicate the range (two left and two right grid units) to detect "rises" in the grid units on the left and right sides of the angle calculation grid unit.

FIG. 9 shows an example in which a three-dimensional map of stationary objects in FIG. 8 is stored as a stationary object detection frequency table in the RAM of the ECU of the vehicle or the radar. In place of the frequency (number of times) of detection of stationary objects along the height axis in FIG. 8, the number of times detected is stored in a memory area addressed by the distance and lateral position. In FIG. 9, however, to clarify the correspondence with FIG. 8, the number of times the stationary objects are detected is not used, but the halftone dot mesh pattern of five grades in terms of detection frequency shown in FIG. 8. In the memory area with halftone dot meshing with the detection frequency of 25 to 50, for example, 35 (25<35<50) may actually be stored as the number of times detected.

The portions defined by thick solid lines in FIG. 9 indicate the angle calculation grid units determined. Also, the portions defined by thick dotted lines indicate the range (two left and two right grid units) to detect the left and right "rises".

FIG. 10 shows an example of a table to store the differential values of the stationary object detection frequency table of FIG. 9.

The method of calculating the differential value was explained with reference to FIGS. 4 and 5. In the case explained above, the differential values, i.e. 0 (=0–0), –5 (=0–5), –7 (=5–12) and +7 (=12–5) of each of the grid units [30, –0.5] to [30, –2.0] are stored in each memory area.

The table of FIG. 10, however, shows an example in which only the signs of the differential values are stored. In this example, the detection of sign change facilitates the detection of a "rise" while at the same time making it possible to easily predict the locations of the angle calculation grid units from the arrangement of the signs. In this case, the angle calculation grid unit can be determined simply by the calculation for the area around a predicted point.

FIG. 11 shows an example of the effects produced by the application of the invention.

FIG. 11 shows an example of the angular error data actually measured with different radar axes in various running environments. The abscissa represents the angle (degrees) of the axis on which the radar is mounted, and the ordinate the measured angular error (degrees). In FIG. 11, the data in circles, which involve an angular error increased by the running environment (FIG. 3), are canceled according to the invention. The other data are not more than one degree and, therefore, are within a tolerable range of angular error.

According to the invention described above, in the case where the stationary object detection data by beam scanning satisfy predetermined conditions for axial deviation determination, the calculation for determining the particular axial deviation is canceled. In this way, the erroneous determination of an axial deviation is prevented and an axial deviation adjustment based on an erroneous determination is avoided.

The invention claimed is:

1. A method of determining the amount of axial deviation of an on-vehicle radar based on a calculated stationary object line determined from a distribution of stationary objects, wherein said axial deviation is a deviation between the axis of direction in which a vehicle, on which the on-vehicle radar is mounted, is running straight and a reference axis of beam scanning of the on-vehicle radar, wherein upon detection of such a factor for determining a calculated stationary object line as to reduce the calculation accuracy of the axial deviation amount is detected in the distribution of stationary objects, the calculation of the particular axial deviation amount is canceled.

2. A method of determining an axial deviation of an on-vehicle radar, comprising:

the first step of acquiring the information on the position of stationary objects by beam scanning within a predetermined time length and the number of times the particular positional information is detected;

the second step of converting the positional information into the address information of a grid-like table having the origin at the current vehicle position, the abscissa representing the lateral position of the vehicle and the ordinate the distance to be covered by the running vehicle in the forward direction, and storing the number of times detected, in the grid area corresponding to the address information;

the third step of determining the first angle calculation grid providing a reference of the calculated stationary object line from a grid column along a predetermined ordinate in the grid-like table;

the fourth step of determining the angle calculation grid unit in a grid column along the predetermined coordinate for the next distance range to be covered by the vehicle in the forward direction within the range of the abscissa including the angle calculation grid unit and the grid units on the left and right sides thereof, and sequentially repeating the determination process; and the fifth step of withholding the calculation to determine the calculated stationary object line connecting the determined angle calculation grid units, in the case where a plurality of rises of the number of times detected are detected from the grid column for the next distance range within the range of the abscissa including the angle calculation grid unit and a predetermined number of grid units on the left and right sides thereof.

3. A method of determining an axial deviation of an on-vehicle radar according to claim 2, wherein the angle calculation grid unit is the grid unit associated with the maximum difference of the number of times detected which is stored in the adjacent grid units in the grid unit column at the third step.

4. A method of determining an axial deviation of an on-vehicle radar according to claim 3, wherein the difference is determined by subtracting the number of times the positional information for the grid units adjacent to the origin are detected, from the number of times the positional information for the grid units at the origin are detected.

5. A method of determining an axial deviation of an on-vehicle radar according to claim 2, wherein a plurality of the rises of the number of times detected are located on the left and right sides of the angle calculation grid unit.

6. A method of determining an axial deviation of an on-vehicle radar according to claim 5, wherein a plurality of the rises located on the left and right sides of the angle calculation grid unit are individually counted by a left rise counter to count the number of rises on the left side and a right rise counter to count the number of rises on the right side, and as long as both the left rise counter and the right rise counter are counting the number of rises, the calculation to determine the calculated stationary object line is not carried out.

7. A method comprising the steps of:
acquiring an information on the position of stationary objects by beam scanning of an on-vehicle radar within a predetermined time length;
converting the positional information into an address information of a grid-like table having the origin, an abscissa representing the lateral position and an ordinate representing the distance to be covered by a running vehicle, and storing the number of times detected in the grid area corresponding to the address information;
determining an angle calculation grid unit in a grid column in the grid-like table and a stationary object line by sequentially repeating the process for determining the angle calculation grid;
calculating an axial deviation of the on-vehicle radar based on the stationary object line; and
canceling the calculation of the particular axial deviation, when a factor for determining the stationary object line that can reduce the calculation accuracy of the axial deviation amount is detected in the distribution of stationary objects.

* * * * *